United States Patent
Jia et al.

(10) Patent No.: US 11,010,016 B2
(45) Date of Patent: May 18, 2021

(54) AUTOMATIC ORIENTATION FOR MIXED REALITY INFORMATION DELIVERY SYSTEM

(71) Applicant: Microsoft Technology Licensing, LLC, Redmond, WA (US)

(72) Inventors: Victor Jia, Richmond (CA); Kevin Thomas Mather, Vancouver (CA); Robert István Butterworth, Vancouver (CA); Kyle Mouritsen, Vancouver (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/869,381

(22) Filed: May 7, 2020

(65) Prior Publication Data
US 2020/0272303 A1    Aug. 27, 2020

Related U.S. Application Data

(63) Continuation of application No. 16/426,587, filed on May 30, 2019, now Pat. No. 10,671,241.
(Continued)

(51) Int. Cl.
*G06F 3/0482* (2013.01)
*G06F 3/0481* (2013.01)
(Continued)

(52) U.S. Cl.
CPC ....... *G06F 3/04815* (2013.01); *G02B 27/017* (2013.01); *G02B 27/0172* (2013.01);
(Continued)

(58) Field of Classification Search
CPC ... G02B 27/017; G02B 27/0172; G06F 3/011; G06F 3/012; G06F 3/0482;
(Continued)

(56) References Cited

U.S. PATENT DOCUMENTS

| 8,405,653 B1 * | 3/2013 | Davidson ............... G06T 19/20 |
| | | 345/419 |
| 2002/0150254 A1 * | 10/2002 | Wilcock .................. G06F 3/167 |
| | | 381/1 |

(Continued)

FOREIGN PATENT DOCUMENTS

KR    20170060473 A    6/2017

OTHER PUBLICATIONS

"International Search Report & Written Opinion issued in PCT Application No. PCT/US20/015759", dated Apr. 24, 2020, 14 Pages.

*Primary Examiner* — William D Titcomb
(74) *Attorney, Agent, or Firm* — Davin Chin; Chin IP, PLLC

(57) ABSTRACT

The disclosed technology is generally directed to mixed reality devices. In one example of the technology, a mixed-reality view is provided to an operator. The mixed-reality view includes both a real-world environment of the operator and holographic aspects. The holographic aspects include at least a first hologram. The first hologram is displayed with a first hologram menu, such that the first hologram menu includes visible selectable menu options associated with the first hologram. In the mixed-reality view, the first hologram menu, including the visible selectable menu options of the first hologram menu, is rotated to face the operator as the operator moves, such that the first hologram menu rotates in a curved manner about the first hologram as the first hologram menu rotates. Responsive to the operator making a selection on the first hologram menu, the first hologram in the mixed-reality view is altered based on the selection.

20 Claims, 7 Drawing Sheets

Related U.S. Application Data

(60) Provisional application No. 62/808,848, filed on Feb. 22, 2019.

(51) Int. Cl.

| | | |
|---|---|---|
| *G06F 3/01* | (2006.01) | |
| *G06F 3/0484* | (2013.01) | |
| *G06T 19/00* | (2011.01) | |
| *G06T 19/20* | (2011.01) | |
| *H04L 29/06* | (2006.01) | |
| *G02B 27/01* | (2006.01) | |
| *G09G 5/37* | (2006.01) | |
| *G09B 5/02* | (2006.01) | |
| *G09B 19/00* | (2006.01) | |
| *G06F 3/16* | (2006.01) | |

(52) U.S. Cl.
CPC .............. *G06F 3/011* (2013.01); *G06F 3/012* (2013.01); *G06F 3/0482* (2013.01); *G06F 3/04845* (2013.01); *G06T 19/006* (2013.01); *G06T 19/20* (2013.01); *G09B 5/02* (2013.01); *G09B 19/003* (2013.01); *G09G 5/37* (2013.01); *H04L 67/38* (2013.01); *G02B 2027/0141* (2013.01); *G02B 2027/0174* (2013.01); *G06F 3/013* (2013.01); *G06F 3/017* (2013.01); *G06F 3/167* (2013.01); *G06T 2200/04* (2013.01); *G09G 2354/00* (2013.01)

(58) Field of Classification Search
CPC ... G06F 3/04845; G06T 19/006; G06T 19/20; G09B 5/02; G09B 19/03; G09G 5/37; H04L 67/38
USPC ........................................................ 715/765
See application file for complete search history.

(56) References Cited

U.S. PATENT DOCUMENTS

| | | | |
|---|---|---|---|
| 2015/0077435 A1* | 3/2015 | Koga | .................... G06T 19/006 345/633 |
| 2018/0074332 A1 | 3/2018 | Li et al. | |
| 2018/0114371 A1 | 4/2018 | Cullum et al. | |
| 2018/0314405 A1 | 11/2018 | Le Doux et al. | |
| 2018/0350145 A1 | 12/2018 | Byl et al. | |

* cited by examiner

AUTOMATIC ORIENTATION FOR MIXED REALITY INFORMATION DELIVERY SYSTEM

CROSS-REFERENCE TO RELATED APPLICATION(S)

This application is a continuation of U.S. patent application Ser. No. 16/426,587, filed May 30, 2019, entitled "AUTOMATIC ORIENTATION FOR MIXED REALITY INFORMATION DELIVERY SYSTEM", which claims priority to U.S. Provisional Pat. App. No. 62/808,848, filed Feb. 22, 2019, entitled "MIXED REALITY USER INTERFACE". The entirety of this afore-mentioned application is incorporated herein by reference.

BACKGROUND

Typically, mixed reality (MR) refers to a combination of virtual and real environments to produce new environments and visualizations where physical and digital objects co-exist and can be interacted with in real time. Typically, mixed reality takes place not only in the physical world or the virtual world, but includes a mix of elements from reality and virtual reality, encompassing both augmented reality and augmented virtuality via immersive technology.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to mixed reality devices. In one example of the technology, a mixed-reality view is caused to be provided to an operator. In some examples, the mixed-reality view includes both a real-world environment of the operator and holographic aspects. In some examples, the holographic aspects include at least a first hologram. In some examples, in the mixed-reality view, the first hologram is caused to be displayed with a first hologram menu, such that the first hologram menu includes visible selectable menu options associated with the first hologram. In some examples, in the mixed-reality view, the first hologram menu, including the visible selectable menu options of the first hologram menu, is caused to rotate to face the operator as the operator moves, such that the first hologram menu rotates in a curved manner about the first hologram as the first hologram menu rotates. In some examples, responsive to the operator making a selection on the first hologram menu, the first hologram in the mixed-reality view is altered based on the selection.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
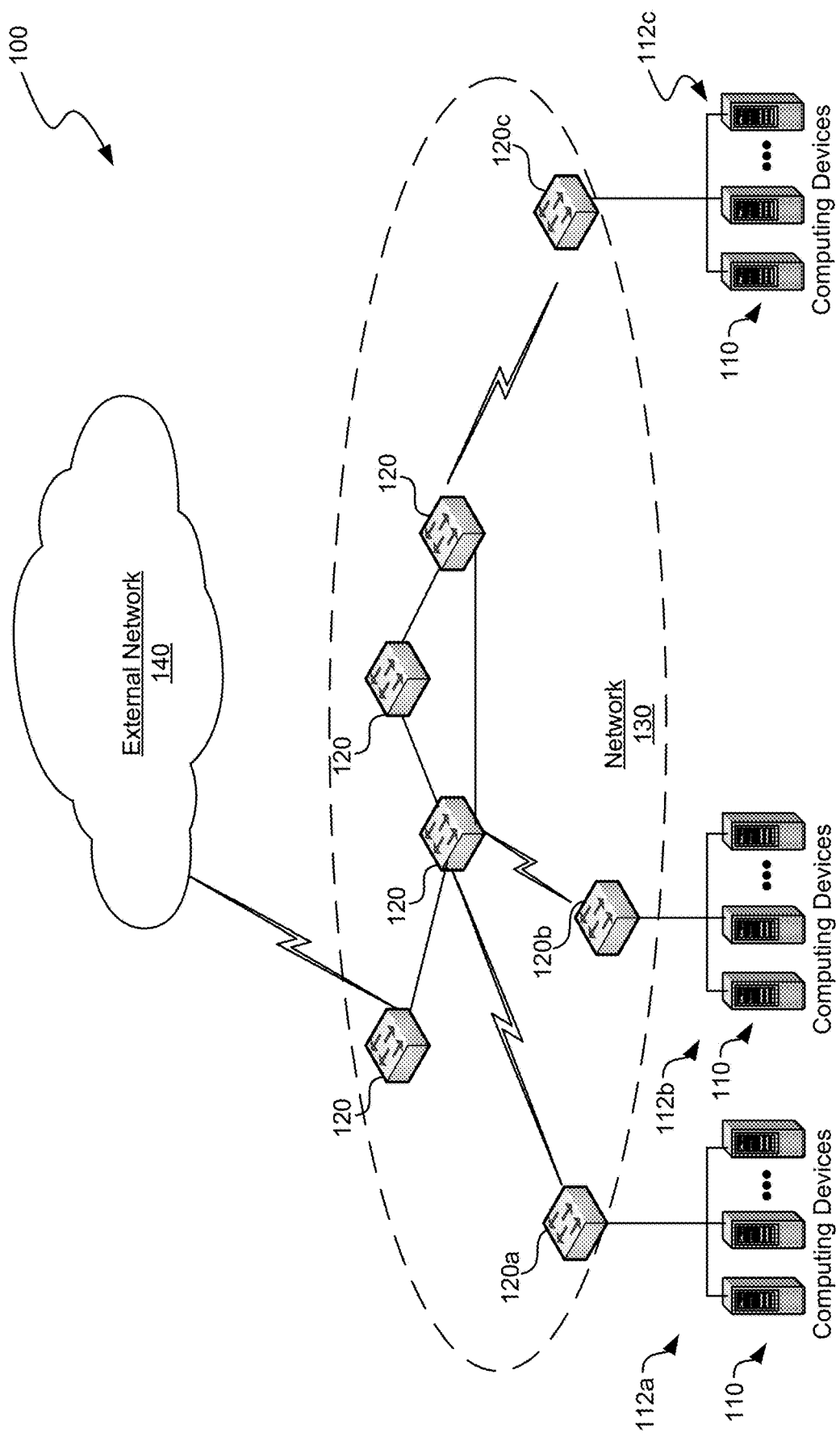
FIG. 1 is a block diagram illustrating one example of a suitable environment in which aspects of the technology may be employed.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on", and includes the option of being based on additional factors, some of which may not be described herein. As another example, the term "via" is not exclusive, and is equivalent to the term "via, at least in part", and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof.

Briefly stated, the disclosed technology is generally directed to mixed reality devices. In one example of the technology, a mixed-reality view is caused to be provided to an operator. In some examples, the mixed-reality view includes both a real-world environment of the operator and holographic aspects. In some examples, the holographic aspects include at least a first hologram. In some examples, in the mixed-reality view, the first hologram is caused to be displayed with a first hologram menu, such that the first hologram menu includes visible selectable menu options associated with the first hologram. In some examples, in the mixed-reality view, the first hologram menu, including the visible selectable menu options of the first hologram menu, is caused to rotate to face the operator as the operator moves, such that the first hologram menu rotates in a curved manner about the first hologram as the first hologram menu rotates. In some examples, responsive to the operator making a selection on the first hologram menu, the first hologram in the mixed-reality view is altered based on the selection.

An operator may wear a wearable mixed-reality device, such as a head-mounted display mixed-reality device, that provides the operator with a mixed-reality view. The mixed-reality view may include one or more holograms with which the operator can interact. Each hologram may include a hologram menu that is displayed with the hologram, where each hologram menu includes selectable menu options. For example, each hologram menu may include a menu option for resizing the hologram, which may be used to resize the hologram.

The hologram menus may rotate to face the operator, based on the operator's gaze. Rather than snapping to each cube face or to each cardinal direction or the like, each hologram menu may instead rotate about the corresponding hologram in a curved manner around the hologram. In this way, when the operator moves in a direction that is not directly to or directly away from the hologram, the hologram menu for the hologram may rotate in a curved manner about the hologram to face the operator.

Illustrative Devices/Operating Environments

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other examples, environment 100 can also include additional and/or different components. For example, in certain examples, the environment 100 can also include network storage devices, maintenance managers, and/or other suitable components (not shown). Computing devices 110 shown in FIG. 1 may be in various locations, including on premise, in the cloud, or the like. For example, computer devices 110 may be on the client side, on the server side, or the like.

As shown in FIG. 1, network 130 can include one or more network nodes 120 that interconnect multiple computing devices 110, and connect computing devices 110 to external network 140, e.g., the Internet or an intranet. For example, network nodes 120 may include switches, routers, hubs, network controllers, or other network elements. In certain examples, computing devices 110 can be organized into racks, action zones, groups, sets, or other suitable divisions. For example, in the illustrated example, computing devices 110 are grouped into three host sets identified individually as first, second, and third host sets 112a-412c. In the illustrated example, each of host sets 112a-412c is operatively coupled to a corresponding network node 120a-420c, respectively, which are commonly referred to as "top-of-rack" or "TOR" network nodes. TOR network nodes 120a-420c can then be operatively coupled to additional network nodes 120 to form a computer network in a hierarchical, flat, mesh, or other suitable types of topology that allows communications between computing devices no and external network 140. In other examples, multiple host sets 112a-412c may share a single network node 120. Computing devices no may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 110 may be individually configured to provide computing, storage, and/or other suitable computing services.

Although FIG. 1 shows an example of a device in a network environment, not all examples of the disclosure are network devices. That is, some examples of the disclosure are capable of operating as connected devices that communicate with one or more networks, and some example of the disclosure are not capable of connecting to a network.

Illustrative Computing Device

Figure 2:
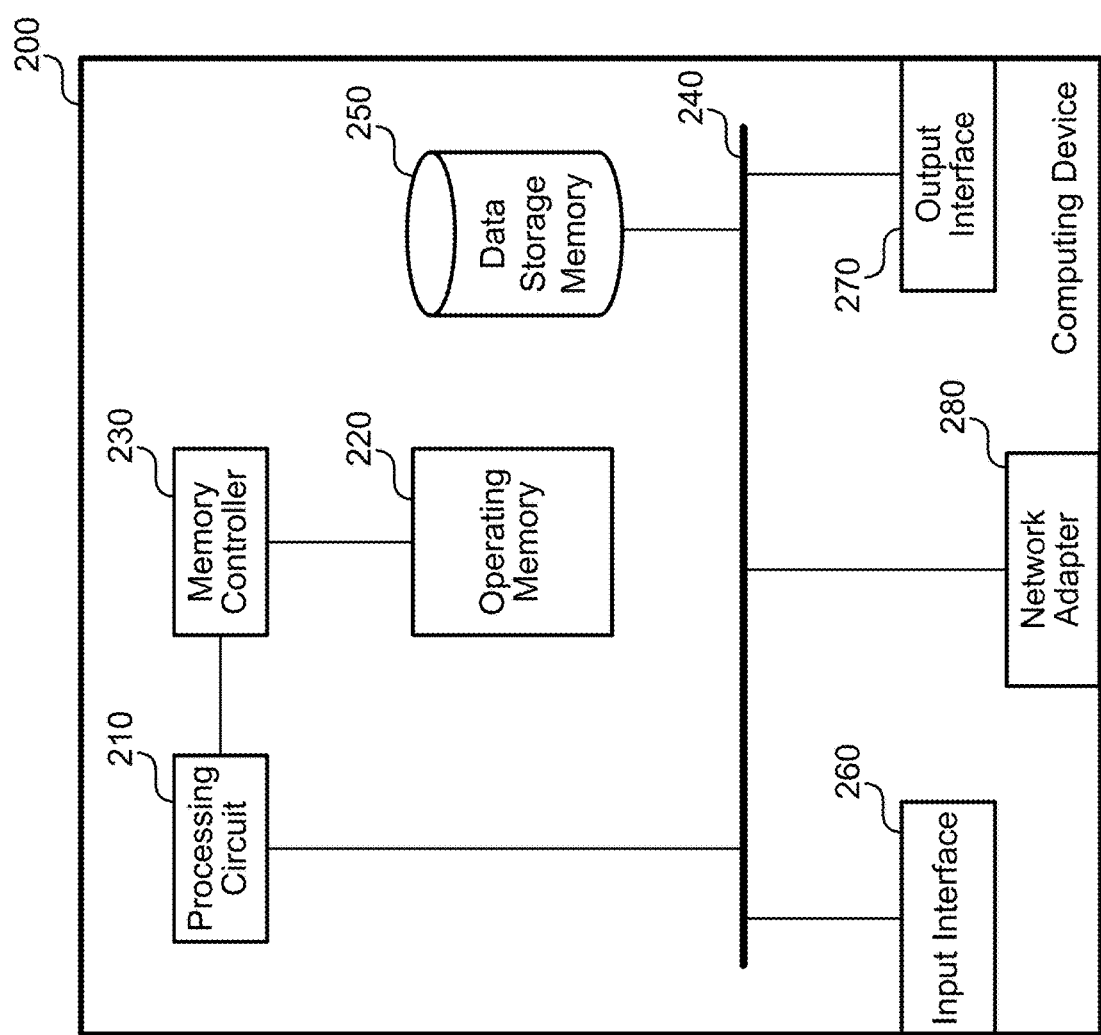
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, or a smartphone. Likewise, computing device 200 may also be server device such as an application server computer, a virtual computing host computer, or a file server computer, e.g., computing device 200 may be an example of computing device no or network node 120 of FIG. 1. Computing device 200 may also be an IoT device that connects to a network to receive IoT services. Likewise, computer device 200 may be an example any of the devices illustrated in or referred to in FIGS. 3-6, as discussed in greater detail below. As illustrated in FIG. 2, computing device 200 includes processing circuit 210, operating memory 220, memory controller 230, data storage memory 250, input interface 260, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, or technology. Processing circuit 210 may include a microprocessor, a microcontroller, a graphics processor, a coprocessor, a field-programmable gate array, a programmable logic device, a signal processor, or any other circuit suitable for processing data. Processing circuit 210 is an example of a core. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process.

Operating memory 220 may include 4th generation double data rate (DDR4) memory, 3rd generation double data rate (DDR3) memory, other dynamic random-access memory (DRAM), High Bandwidth Memory (HBM), Hybrid Memory Cube memory, 3D-stacked memory, static random-access memory (SRAM), or other memory, and such memory may comprise one or more memory circuits integrated onto a DIMM, SIMM, SODIMM, or other packaging. Such operating memory modules or devices may be organized according to channels, ranks, and banks. For example, operating memory devices may be coupled to processing circuit 210 via memory controller 230 in channels. One example of computing device 200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although, FIG. 2 illustrates bus 240 as a single passive bus, other configurations, such as a collection of buses, a collection of point to point links, an input/output controller, a bridge, other interface circuitry, or any collection thereof may also be suitably employed for interfacing data storage memory 250, input interface 260, output interface 270, or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for run-time data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media" (whether in the plural or singular form), throughout the specification and the claims, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing. In yet another example, input interface 260 and/or output interface 270 may include a universal asynchronous receiver/transmitter ("UART"), a Serial Peripheral Interface ("SPI"), Inter-Integrated Circuit ("I2C"), a General-purpose input/output (GPIO), and/or the like. Moreover, input interface 260 and/or output interface 270 may include or be interfaced to any number or type of peripherals.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 280 may also include a wireless network adapter, for example, a Wi-Fi adapter, a Bluetooth adapter, a ZigBee adapter, a Long-Term Evolution (LTE) adapter, or a 5G adapter.

Although computing device 200 is illustrated with certain components configured in a particular arrangement, these components and arrangement are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Some examples of computing device 200 include at least one memory (e.g., operating memory 220) adapted to store run-time data and at least one processor (e.g., processing unit 210) that is adapted to execute processor-executable code that, in response to execution, enables computing device 200 to perform actions.

Illustrative Systems

Figure 3:
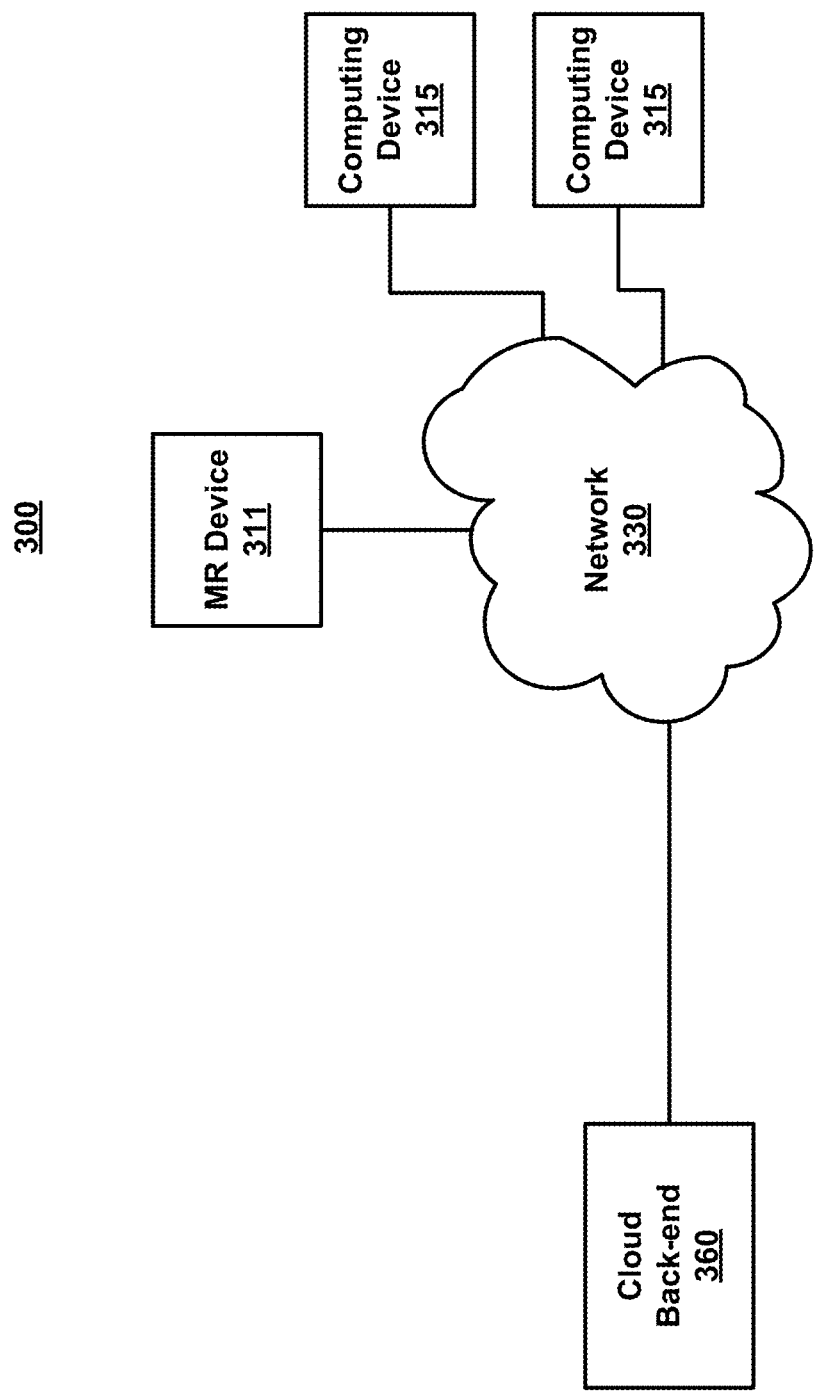
FIG. 3 is a block diagram illustrating an example of a system.

FIG. 3 is a block diagram illustrating an example of a system (300). System 300 may include network 330, as well MR device 311, computing devices 315, and cloud back-end 360, which may each connect to network 330.

MR device 311 and computing devices 315 may each include an example of computing device 200 of FIG. 2. Although two computing devices 315 are illustrated in FIG. 3, in various examples, there may be one computing device 315, three or more computing devices 315, and/or the like. Application back-end 360 refers to a device, or multiple devices such as a distributed system, that may assist in providing functionality to MR device 311 and/or computing device 315 via communication over network 330. FIG. 3 and the corresponding description of FIG. 3 in the specification illustrates an example system for illustrative purposes that does not limit the scope of the disclosure.

Network 330 may include one or more computer networks, including wired and/or wireless networks, where each network may be, for example, a wireless network, local area network (LAN), a wide-area network (WAN), and/or a global network such as the Internet. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. Network 330 may include various other networks such as one or more networks using local network protocols such as 6LoWPAN, ZigBee, or the like. Some devices may be connected to a user device via a different network in network 330 than other devices. In essence, network 330 includes any communication technology by which information may travel between MR device 311, computing devices 315, and cloud back-end 360. Although each device or service is shown connected as connected to network 330, that does not mean that each device communicates with each other device shown. In some examples, some devices/services shown only communicate with some other devices/services shown via one or more intermediary devices. Also, although network 330 is illustrated as one network, in some examples, network 330 may instead include multiple networks that may or may not be connected with each other, with some of the devices shown communicating with each other through one network of the multiple networks and other of the devices shown communicating with each other with a different network of the multiple networks.

Each computing device 315 may perform various functions in conjunction with MR device 311, and each computing device 315 may be capable of communicating over network 330 with MR device 311 and cloud back-end 360. As discussed in greater detail below, one of the computing devices 315 may be used to assist in the creation of guides for MR device 311, and/or the like.

MR device 311 may include any suitable MR device such as a wearable mixed-reality device. Some examples of MR device 311 may be a head-mounted display unit connected to an adjustable inner headband. Some examples of MR device 311 may include a self-contained holographic computer that enables a user to engage with digital content and interact with holograms while simultaneously viewing the real world. Some examples of MR device 311 may include cameras, processors, lenses, 3D audio speakers, a battery, and various specialized components such as multiple sensors, advanced optics, and a custom holographic processing unit. Some examples of MR device 311 may include physical buttons on the side which may be pressed to actuate various functions.

Some examples of MR device 311 may communicate with cloud back-end 360 to provide certain functions associated with MR device 311. Other examples of MR device 311 provide full functionality within MR device 311 without requiring communication with cloud back-end 360, and cloud back-end 360 is not included in system 300 in some examples. In some examples, MR device 311 is network-connected, and in other examples, MR device 311 is not network-connected.

MR device 311 may allow a user to simultaneously view the real world and virtual objects. The user may also be able to manipulate the virtual objects in various ways. The user may also be able to view applications in the mixed-reality view provided by MR device 311.

System 300 may include more or less devices than illustrated in FIG. 3, which is shown by way of example only.

Figure 4:
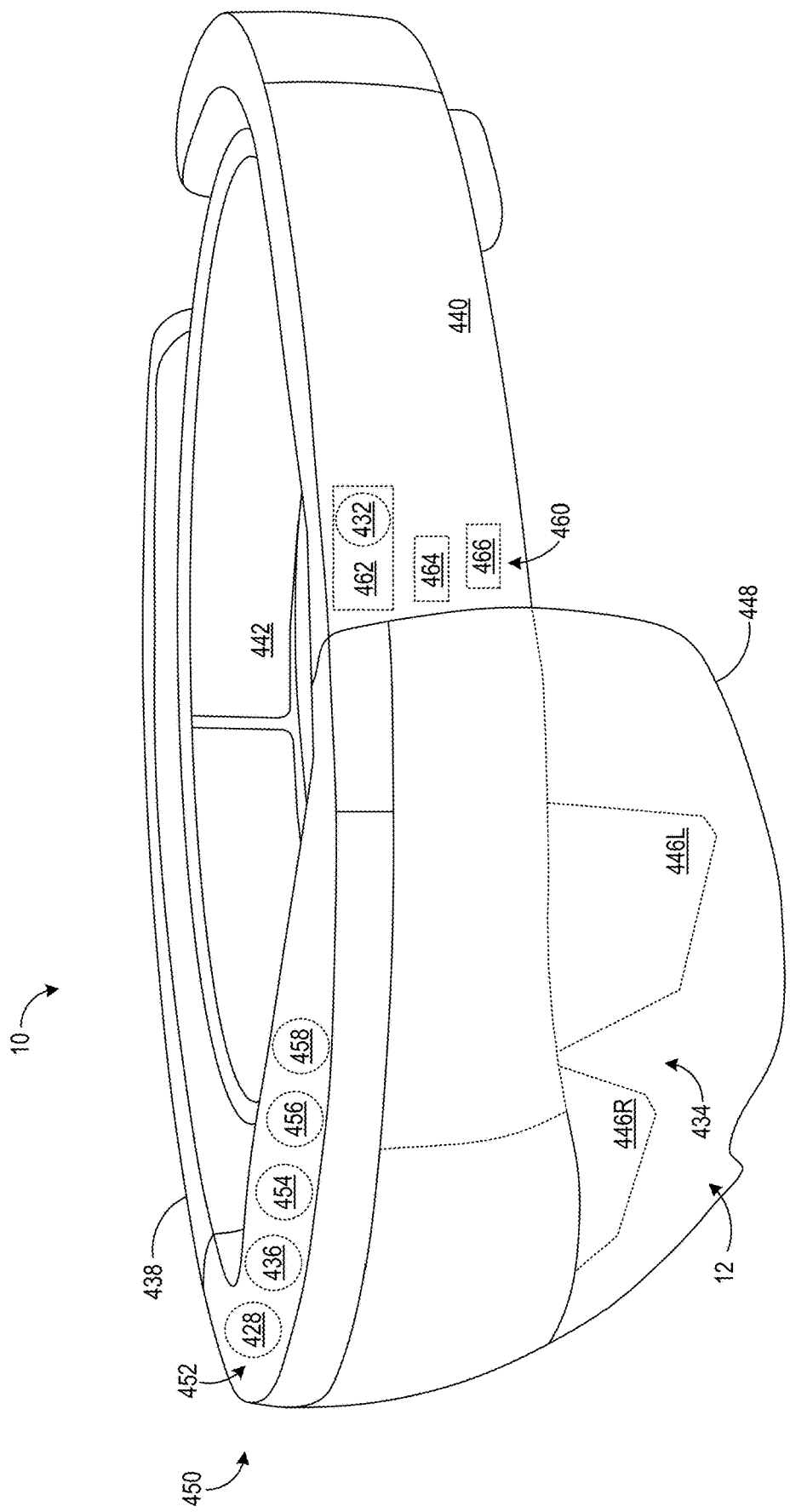
FIG. 4 is a diagram illustrating an example mixed-reality (MR) device.

FIG. 4 illustrates an example of computing device 10, which may be employed as an example of MR device 311 of FIG. 3 and/or computing device 200 of FIG. 2. In the example computing device 10 of FIG. 4, the computing device 10 is a head-mounted display (HMD) device. The illustrated computing device 10 takes the form of a wearable visor, but it will be appreciated that other forms are possible, such as glasses or goggles, among others. The computing device 10 may include a housing 438 including a band 440 and an inner band 442 to rest on a user's head. The display 12 of the computing device 10 may include the at least partially see-through display 434. The at least partially see-through display 434 may be a stereoscopic display and may include a left panel 446L and a right panel 446R as shown, or alternatively, a single panel of a suitable shape. The panels 446L, 446R are not limited to the shape shown and may be, for example, round, oval, square, or other shapes including lens-shaped. The computing device 10 may also include a shield 448 attached to a front portion 450 of the housing 438 of the computing device 10. The at least partially see-through display 434 and/or the shield 448 may include one or more regions that are transparent, opaque, or semi-transparent. Any of these portions may further be configured to change transparency by suitable means. As such, the computing device 10 may be suited for both augmented reality situations and virtual reality situations.

A controller 460 of the computing device 10 may include a logic subsystem 462, a storage subsystem 464, and a communication subsystem 466. The logic subsystem 462 may include one or more processors 432 configured to execute software instructions. A processor of the one or more processors 432 may an example of processing circuit 210 of FIG. 2, and the storage subsystem 464 may include an example of operating memory 220 of FIG. 2.

In some examples, the processor 432 of the computing device 10 is operatively coupled to the display panels 446R and 446L and to other display-system componentry. In some examples, the processor 432 includes logic and associated computer memory configured to provide image signals to the display panels 446R and 446L, to receive sensory signals from a sensor system 452, and to enact various control processes described herein. The sensor system 452 may include one or more location sensors 428, one or more optical sensors 436, a gaze detection system 454, one or more microphones 456, as well as one or more speakers 458. One or more optical sensors 436 may include one or more cameras. The processor 432 may be further configured to provide signals to the sensor system 452.

Display 12 may be configured to display holograms superimposed on a physical environment. Display 12 may be a stereo display that is at least partially see-through, and the hologram may be positioned to appear at a desired depth and position within the user's field of view. Alternatively, in some examples, display 12 includes a display of a portable camera-equipped computing device and the image may be superimposed on an image of the physical environment captured by the camera. In some examples, the processor 432 is configured to store a representation of the physical environment 30 in non-volatile memory 16. The processor 432 may be configured to generate the representation of the physical environment based on inputs received from a sensor system 452.

Figure 5:
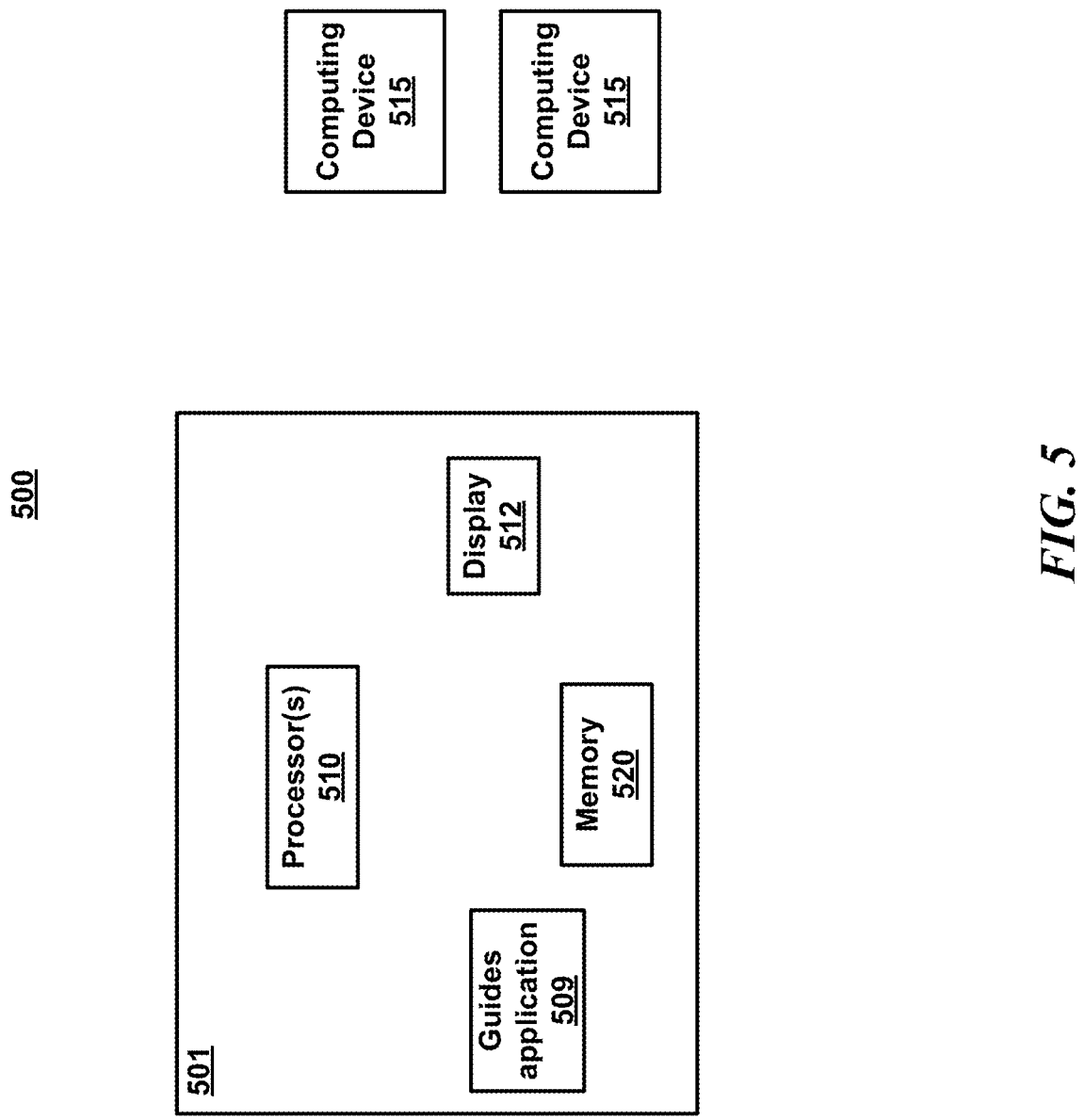
FIG. 5 is a diagram illustrating another example system including a hologram device.

FIG. 5 illustrates an example system (500) including hologram device 501 and computing devices 515. Each of the computing devices 515 may be an example of computing device 200 of FIG. 2 and/or one of the computing devices 110 of FIG. 1. Although two computing devices 515 are illustrated in FIG. 5, in various examples, there may be one computing device 515, three or more computing devices 515, and/or the like. In some examples, hologram device 501 is a computing device that, among other things, provides means for a user to view and interact with holograms. Hologram device 501 may, for instance, be a mixed-reality device, such as MR device 311 of FIG. 3 or MR device 10 of FIG. 4. Hologram device 501 may be an example of computing device 200 of FIG. 2, MR device 311 of FIG. 3, and/or computing device 10 of FIG. 4.

Hologram device 501 may include one or more processors 510, operating memory 520, display 512, and guides application 509. One or more processors 510 may be configured to execute instructions, such as instructions for implementing the herein-described workloads, processes, or technology. The instructions may include guide application 509, and may further include other applications, such as applications that enable an operator to interact with one or more holograms in a mixed-reality view. The aforementioned instructions, along with other data (e.g., datasets, metadata, operating system instructions, etc.), may be stored in operating memory 520 during run-time of hologram device 501. Display 512 may be configured to display holograms to a user of hologram device 501. In some examples, hologram device 501 is a head-mounted display mixed-reality device, or other wearable mixed-reality device.

Many aspects of hologram device 501 are discussed below that may be used in conjunction with each other, or separately. That is, some examples may include all of the aspects of hologram device 501 discussed below, some examples may include but one of the aspects of hologram device 501 discussed below, and some example may include some, but not all, of the aspects of hologram device 501 discussed below. Further, while many aspects of hologram device 501 are discussed in the context of guides application 509, the aspects are not limited to use with guides application 509, and may be applied to various functions provided by hologram device 501 outside of guides application 509.

Some examples of hologram device 501 do not include guides application 509, and various of the aspects may be used by hologram device 501 even though hologram device 501 does not include guides application 509. Each computing device 515 may perform various functions in conjunction with guides application 509, such as the authoring and editing of guides, and/or the like. Many aspects of hologram device 501 may include interaction with holograms, including interaction with hologram in conjunction with guides application 509, and interaction with hologram in contexts other than guides applications, such as with one or more applications other than guides application 509 in which a user interacts with holograms in a mixed-reality view.

Hologram device 501 may provide a mixed-reality view in which the operator can perceive the both the real-world environment and holograms generated by hologram device 501. In some examples, when using hologram device 501, the user may first calibrate hologram device 501. The calibration may be used to ensure that holograms are properly aligned to the environment. For instance, a calibration application may be used to perform the calibration. In some examples, the calibration application may lead the user though the calibration process step by step. In some examples, the user's interpupillary distance (IPD) may be determined as part of the calibration, or the IPD may be set prior to the calibration.

The operator may be able to interact with the holograms in various ways. The holograms may include two-dimensional holograms and three-dimensional holograms. Each of the three-dimensional holograms may be displayed along with a hologram menu for the three-dimensional hologram. Each hologram menu may include menu options that are commands associated with the corresponding hologram. Each three-dimensional hologram may also include rotation handles for rotating the three-dimensional hologram.

In some examples, one or more of gaze, gestures, and/or voice commands may be used to make selections and/or commands, such as selecting a hologram, selecting a menu option, selecting a rotation handle, selecting other options associated with a hologram via buttons, and/or the like.

In some examples, item may be selected by gazing at an item, where the item may be, for example, an app, menu, button, rotation handle, and/or the like. In some examples, the user's gaze may be in the center of the user's view, and the user's gaze may be indicated via a visual indicator such as a cursor dot or the like. In some examples, dynamic cursor visuals may be used for the gaze cursor when suitable. For instance, in some examples, when the user's gaze is on a button, the gaze cursor is replaced with a spotlight effect on that button. In some cases, a user can select an item by gazing at a selection box. In some examples, the select does not occur immediately; rather, a selection is made responsive to a user's gaze dwelling in the selection box. For instance, in some examples, when the user's gaze enters a selection box, a dwell timer begins, and the selection is made if the user's gaze remains in the box for the entirety of the dwell timer.

In some examples, when the user's gaze enters the selection box, the box begins filling to indicate a select in progress, and the item is selected when the box is filled, which occurs if the gaze remains in the box for the entirety of the dwell timer, with the filling box providing the user with a visual display of the dwell timer. In some examples, a sound is also provided while the box is being filled to indicate that a selection is in process. Selection of an item via gaze may be extremely helpful the user's hands are occupied with tools or parts. In some examples, when a selection box on the Step card is being filled, it is ensured that the Step card does not move.

In other cases, a user may use gaze to target an object, and then act on the target with a gesture. In some examples, a bloom gesture may be used to open or close a pre-determined menu, such as the high-level menu for a guide. In these examples, when a user is uncertain of what to do, the bloom gesture may be a good way for the user to get oriented. In one example, to do the bloom gesture, the user will hold out the user's hand with the user's palm up and fingertips together, and then the user opens the user's hand.

In some examples, as discussed above, an app or other hologram may be selected in multiple ways, including with a gesture. In some examples, the air tap gesture may be used to open a hologram. In some examples, a user may select a hologram with an air tap by gazing at a hologram, holding the user's hand straight in front of the user in a loose fist, and then pointing the user's index finger straight up toward the ceiling, then tapping the user's finger down, and then quickly raising the user's index finger back up again.

In some examples, a user can interact with the holographic environment in different ways, which may vary based on user preferences, or based on the particular circumstances. For example, in some circumstances, a user's hands may not be free to perform gestures, and in some circumstances, the environment be too noisy for voice commands. For instance, in some examples, to perform a selection, a user may use an air tap gesture, may use a voice command (such as saying "select"), or may select with gaze (such as by moving the user's gaze to the corresponding selection box and leaving it there until the selection box if filled).

In some examples, a user may say a command, instead of selecting a button. For instance, in some examples, selectable buttons may also include an indication of the voice command that may be used to select the button. For instance, in some examples, each menu option of the rotating menu may include text on the button. To select that button, a user may select the hologram and then say that command. For instance, in some examples, each three-dimensional hologram includes a hologram menu that includes multiple menu options, where one of the menu options may have the text "resize" on or near the button—so to resize a hologram, a user may select the hologram and then say "resize" to select the resize menu option for the hologram.

In some examples, it is unnecessary for a user to go into an adjustment mode to move a hologram. Rather, in some examples, a user can simply select a hologram and then move it. In other examples, a user may first select an adjustment mode via the hologram menu associated with the hologram, and then move the hologram while in the adjustment mode for the hologram.

In some examples, a hologram has a corresponding bubble, where selection of the hologram is accomplished by selecting the bubble. In some examples, the bubble has a fixed size, regardless of how far/near the hologram is or how large/small the hologram is made. In this way, the bubble can still be selected easily—for example the bubble can still be selected even if the corresponding hologram is very small, and the bubble and its corresponding controls can still be accessed even if the hologram if very large and would otherwise make the control inaccessible because the hologram is too large. In some examples, the size of the bubble is not fixed, but the size of the bubble is kept in a range that is capable always of being manipulated. In some examples, it is not just the hologram that scales or remains at a fixed size, but so do other associated controls, such as the rotation handles and the hologram menu.

In some examples, each hologram includes rotation handles. In some examples, the rotation handles are visible to the user, for example as dots or the like. In some examples, each 3D hologram has three rotations handles, and each of the three rotation handles is represented by a blue dot. In some examples, one rotation handle is for left/right rotation, one rotation handle is for up/down rotation, and another rotation handle is for free rotate.

In some examples, progressive disclosure of UI affordance is used throughout various applications of hologram device 501, with rotation handles and in other ways. In some examples, the rotational handles may be visible at all times that the corresponding hologram is visible, and in other examples, the rotational handles may only appear when the operator's gaze is near the hologram. In some examples, each rotation handle has corresponding rotation arrows that appear when the cursor dot associated with the operator's gaze moves over the rotation handle, but that are not present otherwise.

In some examples, the corresponding rotation arrows may seem to grow out of the rotation handle when the gaze cursor moves over the rotation handle. By not having the rotation arrows be present all of the time in these examples, the operator is not overwhelmed with too much information. However, in some examples, when the operator's gaze is on the rotational handle, the arrows appear, and reveal the way in which the rotational handle can be manipulated in order to rotate the hologram accordingly. In some examples, when the operator selects a rotation handle, everything else is hidden, and a new graphic of a full ring is rendered which immediately gives the user a sense of how to move their hand to manipulate the hologram.

This is an aspect of progressive disclosure of UI affordance used in some examples, in that visuals are progressively added based on user actions that hint at what actions can be associated with an action, and when the action is finally invoked, everything else is hidden, because only that action matters while that action is being undertaken. In some examples, such progressive disclosure of UI affordance graduates a user's understand of what the user is going to do, without overwhelming the user, even if the user has never done the task before. In some examples, the author can also place pivot points in space to rotate objects around that point. In these examples, this allows the author to position and rotate one or more 3d models around their chosen point in space, instead of having to move each model across it center point.

Additionally, the tool may limit the user in particular ways, with built-in constraints, which may be based on safety considerations and other factors. In some examples, the rotation handles re-center and/or reset their locations after each use. In this way, in some examples, rotation handles are not in an awkward location or angle after manipulation. Instead, in some examples, the rotation handles are always easy and familiar and instinctive to grab.

In some examples, each three-dimensional hologram may be moved/translated by selecting and moving the hologram, may be rotated by making use of the rotation handles associated with the hologram, and may be altered in other ways by making use of the hologram menu associated with the hologram.

In some examples, each hologram has a corresponding shape, such as a cube, which includes a hologram menu for the hologram. In some examples, the hologram menu is at the bottom of the cube. In other examples, the hologram menu is in another suitable location on the cube. Items from the menu may be selected in order to manipulate the hologram in various ways.

In some examples, rather than having the menu snap to each 90-degree angle of the cube, the menu may rotate so that the menu is facing whichever direction the user is looking at the hologram. In this way, in these examples, the user need not physically adapt to the hologram by only accessing the menu from specific angles; rather, in these examples, the menu curves around so that it is visible at every angle, so that the facing of the menu is always relative to the user. In some examples, the cube itself rotates in a curved manner such that the cube face that includes the hologram menu rotates to face the user. In some examples, the hologram menu rotates on a sphere that is independent of the cube. In some examples, the holograms do not have such a cube and the hologram menu rotates on a sphere or orb without any use of a cube.

As discussed above, in some examples, each three-dimensional hologram in the mixed-reality view may be displayed with a hologram menu, where each menu includes selectable menu options. The hologram menus may rotate to face the operator, based on the operator's gaze. In some examples, when the operator moves in a direction that is not directly to or directly away from the hologram, the hologram menu may rotate in a curved manner about the corresponding hologram to face the operator.

In some examples, the hologram menu does not rotate if the operator moves directly closer to the hologram menu or directly away from the hologram menu, since the user's angle to the hologram menu has not changed in this case and the hologram menu remains directly facing the operator in spite of the operator's motion, but the hologram menu does rotate responsive to the user moving in a direction that is not directly toward or directly away from the user. In some examples, the hologram menu may change its facing to rotate to remain facing the user responsive to the user moving around the hologram, i.e., in a direction that is azimuthal relative to the hologram menu, so that the hologram menu moves clockwise or counterclockwise to continue facing the user based on the user's movement that is clockwise or counterclockwise around the hologram.

In some examples, the hologram menu moves clockwise or counterclockwise to continue facing the user based on the user's movement, but does not rotate up or down to face the user if the user moves in a direction that is higher or lower that the user's previous position. In other examples, the hologram menu rotates not only clockwise and counterclockwise in a curved manner about the hologram, but also rotates up and down in a curved manner about the hologram, where necessary to continue directly facing the user. Accordingly, in some examples, the hologram menu rotates about the sphere responsive to the user moving in an azimuthal and/or latitudinal manner relative to the first hologram menu.

As discussed above, progressive disclosure of UI affordance may be used with regard to the rotation handles. Progressive disclosure of UI affordance may also be used with the hologram menu in some examples. Just as the rotational handles are only shown under certain circumstances in some examples, such as the operator's gaze nearing the hologram, similarly, in some examples, the hologram menu is only shown in certain circumstances. Similarly, in some examples, the hologram menu is not shown until a hologram menu button on the hologram is selected. For instance, in some examples, the hologram menu button may simply be a small button with " . . . " on the button to indicate that more selections are available by selecting the hologram menu button.

In some examples, the hologram menu button is not visible until the operator's gaze nears the hologram, and the hologram menu does not appear until the hologram menu button is selected. In some examples, even when the hologram menu is shown, the hologram menu may be shown only as small buttons with a symbol on each button. In some examples, under certain circumstances, each symbol may further include one text word next to the symbol indicating the function of the button. In some examples, some of the buttons may be sub-menu buttons, that cause menu options associated with the sub-menu to be displayed when the sub-menu button is pressed. In this way, progressive disclosure of UI affordance may be achieved with respect to available commands for altering each of the three-dimensional holograms.

Responsive to the operator selects a menu option for a hologram menu of a hologram, in some examples, hologram device 501 then causes the corresponding selected command to happen, altering the corresponding hologram accordingly. For instance, in some examples, responsive to the operator selecting a menu option from a hologram menu of a hologram causing the hologram to resize, hologram device 501 causes the corresponding hologram to resize accordingly.

Figure 6E:
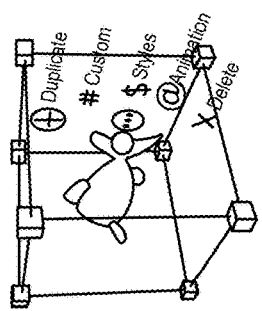
FIGS. 6A-6E are diagrams illustrating an example of progressive disclosure of UI affordance with an example three-dimensional hologram.
Figure 6D:
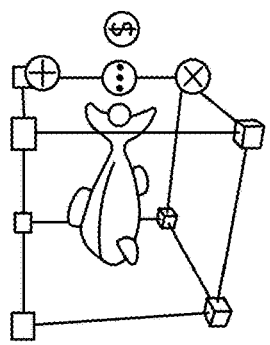
Figure 6C:
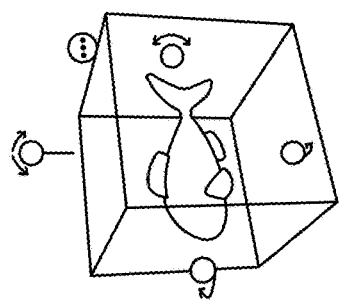
Figure 6B:
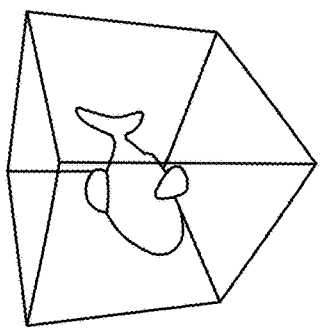
Figure 6A:
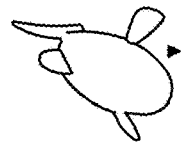

FIGS. 6A-6E illustrate an example of progressive disclosure of UI affordance with an example three-dimensional hologram. FIGS. 6A-6E do not illustrate the rotation of the facing of the hologram menu to face the operator. As shown in FIG. 6A, in some examples, in some circumstances, only the hologram itself is visible. As shown in FIG. 6B, in some examples, in some circumstances, the hologram and a bounding box, such as a cube as shown in FIG. 6B, are visible. As shown in FIG. 6C, in some examples, in some circumstances, the hologram, a bounding box, rotation handles, and a hologram menu button are visible. As shown in FIG. 6D, in some examples, if the hologram menu button is pressed, an abbreviated hologram menu is shown, in which each menu option of the hologram menu is shown as a small button for each menu option, where each menu option is large enough for only one symbol, indicative of the corresponding command, to be shown on the button. As shown in FIG. 6E, in some examples, in some circumstances, such as the operator's gaze nearing the vicinity of the abbreviated hologram menu, the hologram menu may be displayed rather than the abbreviated hologram menu, with a text word next to each of the hologram menu options buttons indicating the corresponding command for the menu option.

Some examples discussed above have included examples in which each three-dimensional hologram may be moved by selecting and moving the hologram, may be rotated by making use of the rotation handles associated with the hologram, and may be altered in other ways by making use of the hologram menu associated with the hologram. However, in other examples, moving may be accomplished via use of the hologram menu associated with the hologram, and in some examples, rotation may be accomplished via use of the hologram menu associated with the hologram rather than via rotation handles.

The examples in which each three-dimensional hologram may be moved by selecting and moving the hologram, may be rotated by making use of the rotation handles associated with the hologram, and may be altered in other ways by making use of the hologram menu associated with the hologram, are examples in which, in some instances, the hologram menu is used for secondary functions, which are used 25% of the time or less, and the other functions, such as moving the hologram or rotating the hologram, are primary functions, which are used 75% or more of the time. While in some examples secondary functions are accessed via the hologram menu and primary functions are accessed in other ways, in other examples, some primary functions may also be accessed via the hologram menu. Also, in some examples, some of the secondary functions may be accessed in manners other than the hologram menu. For instance, in some examples, resizing of a hologram may be accomplished by selecting a hologram and then using a hand gesture to resize the hologram, instead of or as an alternative way than the hologram menu to resize the hologram.

In some examples, secondary functions accessed via the hologram menu may include editing functions, where editing functions may include scaling functions and property editing function. Scaling functions may include resizing functions which may cause the corresponding hologram to become larger or smaller. Scaling functions may include uniform resizing and other types of scaling functions. Property editing functions may include functions such as delete, duplicate, animate, edit style, and/or the like. In some examples, some property editing functions are allowed in an authoring mode and disallowed during normal operation.

Returning to FIG. 5, in some examples, an operator of hologram device 501 may begin using hologram device 501 to perform tasks by first calibrating hologram device 501, and then opening a guide. In some examples, once a guide is open, the guide first contains alignment instructions. The operator may then align the guide by following the alignment instructions. Aligning the guide may be used to ensure that the holographic instructions line up with the real-world environment. In some examples, some guides may include a marker alignment, which uses a hologram marker that looks just like a printer marker that is in the real-world environment. In some examples, the operator aligns the guide by finding the printed marker in the real-world environment, aligning the hologram marker with the printed marker, and then confirming the alignment.

In some examples, the alignment may be accomplished with a manual alignment rather than a marker alignment. In some examples, to perform manual alignment, the operator uses a gesture to align the guide to a digital 3D representation laid over a physical object in the work area. For instance, in some examples, if the author of the guide chose manual alignment when the author created the guide, the operator would align a hologram with a digital 3D representation of the same object in the real world.

Three-dimensional holograms may be used with hologram device 501 as part of a mixed-reality view in a variety of different contexts. One particular context in which the three-dimensional hologram may be used as part of a mixed-reality view is with guides application 509.

Guides application 509, responsive to execution in hologram device 501, may be a mixed-reality application that provides guidance with real world activities via holograms. For instance, in some examples, guides application 509 may provide holographic instructions when and where they are needed. This may be used to enable an operator to receive step-by-step instructions on new tasks, may act as a checklist for a task that is familiar to the operator, or the like. In some examples, each task is divided into steps. While performing the task using guides application 509, for each step of the task, a holographic step card may be provided to the operator as part of the mixed reality view, where the step card may include an instruction for the current step of the task. The mixed-reality view may also include a tether that connects the step card for the current step of the task to a tether location for the current step of the task.

In various example applications for which hologram device 501 is used, a visual tether is used to connect to a tether location, which is a real-world location at which work is to be performed, at which part of the task is to be performed, or at which some similar step or action is to be performed. In some examples, the visual tether connects from the step card to the tether location, where the instruction on the step card is associated with something to be done at the tether location. In some examples, the tether is a holographic dashed white line that connects the step card to the tether location. In these examples, although the tether is a line, the line is typically curved. In some examples, the operator of hologram device 501 can read the instruction on the step card, and then follow the tether from the step card to the tether location. The operator may also use the tether by following the tether to return to the tether location at any time, for example, after the user's attention is distracted. The tether location may also include a 3D hologram associated with the work, task, action, or step that the user is to perform at the tether location.

The step card may include various buttons that the user can activate to perform various functions. For instance, in some examples, the user may be able to use the step card to navigate through various steps of the task, such as through a next step button, a go back button, and other means. The step card may also in some way indicate which step the user is currently on. The step card may include one or more buttons to turn on and off media associated with the step card, such as pictures or video that may assist the operator in performing the step. Various options and commands for the step card may be actuated in different ways in different examples, such as through gestures, gaze, and/or voice commands, as discussed in greater detail below.

In some examples, guides application 509 may enable increased productivity in a workforce by enabling the workforce to learn while doing their work. For instance, some examples of guides application 509 enable employees to learn in the flow of work by providing holographic instructions when and where they need them. Guides application 509 may be used in a variety of different contexts, including performing an operation, such as assembly in a manufacturing setting as but one example. In some examples, step cards act as a series of step-by-step instruction cards with image and video support, where each step card is visually tethered to the tether location for the step, the real-world place where the work needs to be done for the step. A digital object may also exist at the tether location. In some examples, additional guidance in the form of holographic models shows what needs to be done where, so workers can get the job done faster, with fewer errors and greater retention of learned skills, and help reduce the cognitive load of workers.

Guides application 509 may provide authoring tools for the creation and adding of guides to be subsequently used by used to complete the process for which the authored guide provides guidance. In some examples, work processes are captured using the authoring tool to create guides, which, in some examples, are files that include step-by-step instructions with images, video, and/or 3D holograms.

In some examples, the authoring tools may be used to create or partially create the guides on one of the computing devices 515, which may be a device separate from hologram device 501, and then the guides can be transferred to hologram device 501, to complete the guides, and for subsequent use of the guides by operators. In some examples, an author can use the author tools to create a guide on one of the computing devices 515, which may be a personal computer or other computing device. Using the author tools, in some examples, an author can begin authoring a guide using the author tools on one of the computing devices 515, transfer the guide to hologram device 501, and then, using guide application 509 via hologram device 501, connect the step cards and holograms to the physical work space using hologram device 501 by simply picking up and moving the step cards and holograms to the correct locations. In some examples, files, including the guide, are synchronized across several devices, including computing device 515 and hologram device 501, so that, rather than explicitly transferring the file from computing device 515 to hologram device 501, the guide will also be present on hologram device 501 via the file synchronization.

Guides application 509 may enable an improved training system. Typically, training occurs away from the flow of work in a training facility, and then requires a buddy system with experienced mentors to bring workers up to speed. Typically, some complex procedures are not needed regularly, and just-in-time training is needed. Typically, task cards and standard operating procedures are on paper or a 2D device that requires an operator to read, process, and then do.

In contrast, guides application 509 may enable operators to learn a task or be informed of updated instructions while in the flow of work. Guides application 509 may be used for complex procedures on the job or while training away from the production line, providing heads-up, hands-free, step-by-step instruction in the flow of work. Guides application 509 may enable operators to control the interface with their gaze—for example, using a glance to move to the next step—leaving their hands free to do the work.

In some examples, after an operator opens a guide, and performs alignment, if necessary, the operator will then see the first Step card of the guide that is provided as a hologram as part of the mixed-reality view. The holographic Step card may be a two-dimensional hologram or a three-dimensional hologram. In some examples, the Step cards provides the instructions that an operator follows to complete a task. In some examples, the Step card also includes, among other buttons, two buttons used to navigate through a guide—the Next Step and Go Back buttons. In some examples, once an operator completes a step, the operator can select the Next Step button to go to the next step, and so on, until all of the steps in the guide are completed.

In some examples, in addition to the Next Step and Go Back buttons, the Step card includes a number of different buttons and user interface (UI) elements to help the operator take various actions.

In some examples, the Step card includes a Task/Guide progress bar. In some examples, the Task/Guide progress bar indicates where the operator is within a task, and within the entire guide. In some examples, the operator can leave a task midway (by using the bloom gesture) and come back to the same position in the guide during a run. In some examples, progress is saved during this step and the operator can start from where the operator left off, unless the operator closed the application.

In some examples, Step cards are linked by holographic tethers to physical areas in the work area. In some examples, a tether is a holographic link that ties a step visually to an area, object, or the like that is relevant to the step. A tether may help the operator find the area where the operator needs to take an action. In some examples, the tether is a holographic dashed white line leading from the step card to an area, object, or the like that pertains to the step indicated on the Step card. In these examples, although the tether is a line, the line is typically curved. The operator may follow the tether to find the physical area where the operator needs to do the work, and then, once the work is completed, or when the operator needs to refer back to the step, follow the tether back to the Step card to read the instructions. If the tether points behind the operator, then the operator may step to the side and then continue to follow the tether.

In various examples, the tether location may be a fixed location in the real-world, at which a 3D hologram may exist, or the tether location may be the location of the 3D hologram, where the hologram is situated meaningfully in the real world, such that if the 3D hologram is moved, the tether location is moved accordingly. In this way, in these examples, the tether location may be a fixed real-world location or a meaningful spatially situated instruction hologram such as an arrow, zone, or 3D computer-aided design (CAD) file overlaid on top of a real physical object.

In some examples, the tether serves to tether instructions to the real world. In this way, in these examples, an operator may follow the tether in order to look at what the instructions are referring to in the real world. Instructions may also be useful if an operator returns to the task—the operator may follow the tether to return to a work area. The tether may link the Step card to the tether location—the real-world location at which work is to be performed for the step. There may also be a three-dimensional hologram at the tether location. For instance, if a part is to be installed in a machine during the step, the tether may connect the step card to the location where the part is to be installed, with, at the location, a three-dimensional hologram of the part that is to be installed, as the part will appear once the part has been installed.

In some examples, the operator can turn holograms off (or turn them back on), for example if the operator feels like a hologram is getting in the way. In some examples, an operator can turn off a hologram by gazing at the "eye" in the middle of the tether.

Although guides provided by guides application 509 may be useful for relative beginners, one or more guides may also be useful to experts. For instance, an expert may benefit from turning off holograms and/or tethers, but still using a checklist. The checklist may be particularly useful, even for an expert, particularly for use with a complex task for which it is crucial not to miss any steps.

In some examples, the authoring of guides for guides application 509 may be accomplished with the use of two applications: one application on one of the computing devices 515, and guides application 509 in authoring mode. In some examples, an author may start with an application on one of the computing devices 515, using the application to create the guide, choose an alignment method, add tasks and steps, write the instructions for the steps, and assign different types of assets to support those steps. In some examples, these supporting assets may include: 3D parts; 3D objects, such as objects from the 3D toolkit (arrows and numbers, for example); 2D media (images and videos); and/or the like.

In some examples, after creating the guide on an application on computing device 515, the author may use guides application 509 on hologram device 501 in Authoring mode to test the flow of the guide, assign holographic tethers to show operators where to focus, place holograms in the real world, and add styles to 3D objects (such as a warning or caution, for example).

The author may also choose an alignment method for the guide. Alignment may refer to the process of gaining an understanding of the world around the user and accurately placing holographic instructions in relation to their work. In some examples, calibration takes into account the user's interpupillary distance (a number that varies across individuals) that further improves alignment. In some examples, if marker alignment is selected, the author attaches a printed marker to a physical object in the real world. In some examples, if manual alignment is selected, the user imports a 3D representation (such as a CAD model or scanned model), and then lays the representation directly over a physical object in the real world. Independent from the method used for alignment, the following additional factors may impact the accuracy of the alignment and/or user perception of the alignment: the Interpupillary distance (IPD) setting, pre-scanning the environment, and device positioning. The IPD is the distance between the center of the user's pupils, which may be set on hologram device 501, as discussed in greater detail above.

Pre-scanning the environment may be accomplished by hologram device 501 actively scanning its environment for visible features to create maps of its surroundings. In some examples, hologram device 501 pre-scans the environment whenever the hologram device 501 is turned on and a user is signed in to hologram device 501. In some examples, hologram device 501 constantly improves the accuracy of these maps as it scans the environment from different viewpoints and stores them on the device. In some examples, holograms are placed in relation to these maps. In some examples, the more accurate the map, the more accurate the hologram placement.

In some examples, before using Guides on a hologram device 501 that is unfamiliar with its environment, the user may wish to put on hologram device 501, sign into hologram device 501, and walk around the space where hologram instructions are placed or will be placed. In some examples, walking at a leisurely pace while slowly looking up and down will give the device the opportunity to find features and construct accurate maps. In some examples, this only need be done once for each environment because hologram device 501 stores the maps it created on the hologram device 501.

In some examples, after selecting an alignment method, the author may use the Outline page, which may be used to create the framework for the guide by adding as many tasks and steps as needed. In some examples, tasks are groups of steps; steps are the short, discrete work items that operators do to complete the task; and steps are the central building blocks for guides. In some examples, a special step called a Completion step as the last step of the guide lets operators know when they've reached the end of the guide. In some examples, the tasks, and the steps for each task, are entered on the Outline page. In some examples, in addition to tasks and steps, the Outline page shows customizable operator instructions.

In some examples, steps can be created directly on the outline page, or from a Step card page. In some examples, in the Step card page, the author writes the instructional text and assigns supporting assets for that step, such 3D content or media (e.g., image, audio, and/or video). In some examples, when the author views the guide on hologram device 501 in Authoring mode, the author will be able to see all of the assets that are associated with the steps, and can then use the authoring mode place the assets in their relevant spaces in the real world. For instance, in some examples, if an author assigns a pointer to a step in the application on one of the computing devices 515, the author can subsequently align that pointer to the thing that the author wishes to point to in the authoring mode of guides application 509 of hologram device 501. The author may place one or more instances of 3d models in space.

In some examples, once the author has finished the creating all of the steps on the application of one of the computing devices 515, the author can then take the next major step to creating the guide on hologram device 501, in Authoring mode of guides application 509. In entering Authoring mode, the author may align the guide, test the flow of the guide, add holographic tethers to visually tie the steps to physical objects in the real world, place holographic 3D content in the relevant corresponding spaces in the real world, and may, if desired, add styles to 3D content to add treatments such as a warning or caution. In some examples, the author can add visual design, including color, size, style selection, and other tools, including the selection of the color and size of holograms.

After aligning the guide, the author may test the flow of the whole guide to see how the guide flows. As the author steps through the guide, the author may make note of things be changed in the guide. For example, as a result of stepping through the guide, the author may wish to move some steps around, add tasks or steps, or add more supporting assets, and the author may wish to make these changes on one of the computing devices 515 before starting to place holograms, tethers, and styles.

When placing holograms, the author may walk through each step in the guide and place any assets that the author associated with that step when it was authored on one of the computing devices 515. For example, if the author added a 3D part to support a step, the author may place that 3D part over the part's physical counterpart in the real world. If the author added a 3D object from the 3D toolkit (an arrow or a number, for example), the author may place that object in an appropriate place in the real world to draw the operator's focus. In some examples, the author can place the same 3D part or 3D object as many times as desired.

In some examples, no further actions are necessary with regard to associated media such as video or audio, which will automatically appear when the operator goes to the step. In some examples, the user can select the Media button to close the image, video, or other media.

In some examples, the 3D assets associated with each step appear below the Step card. In some examples, to place them in the real world, the author may manipulate holograms as discussed elsewhere, such as via gestures. Tethers may be placed in the real-world environment, for example via gestures. Similarly, styles may be applied to holograms.

Figure 7:
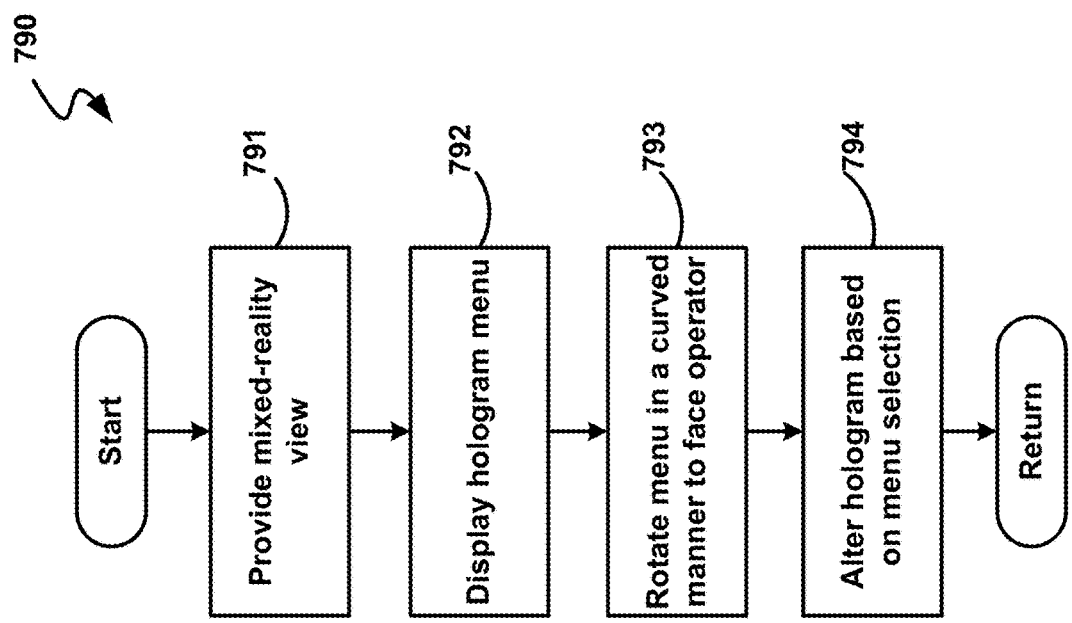
FIG. 7 is a flow diagram illustrating an example of a process for an MR view, in accordance with aspects of the present disclosure.

FIG. 7 illustrates an example dataflow for a process (790) for an MR view. In some examples, process 790 is performed by a device, such as device 200 of FIG. 2, MR device 311 of FIG. 3, computing device 10 of FIG. 4, or hologram device 501 of FIG. 5.

In the illustrated example, step 791 occurs first. At step 791, in some examples, a mixed-reality view is caused to be provided to an operator. In some examples, the mixed-reality view includes both a real-world environment of the operator and holographic aspects. In some examples, the holographic aspects include at least a first hologram. As shown, step 792 occurs next in some examples. At step 792, in some examples, in the mixed-reality view, the first hologram is caused to be displayed with a first hologram menu, such that the first hologram menu includes visible selectable menu options associated with the first hologram.

As shown, step 793 occurs next in some examples. At step 793, in some examples, in the mixed-reality view, the first hologram menu, including the visible selectable menu options of the first hologram menu, is caused to rotate to face the operator as the operator moves, such that the first hologram menu rotates in a curved manner about the first hologram as the first hologram menu rotates. As shown, step 794 occurs next in some examples. At step 794, in some examples, responsive to the operator making a selection on the first hologram menu, the first hologram in the mixed-reality view is altered based on the selection. The process may then advance to a return block, where other processing is resumed.

Conclusion

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. An apparatus, comprising:
a device including at least one memory adapted to store run-time data for the device, and at least one processor that is adapted to execute processor-executable code that, in response to execution, enables the device to perform actions, including:
   causing a mixed-reality view to be provided to an operator, wherein the mixed-reality view includes both a real-world environment of the operator and holographic aspects including at least a first hologram, wherein the first hologram is a three-dimensional hologram;
   causing, in the mixed-reality view, the first hologram to be displayed with at least three rotation handles of the first hologram, wherein the at least three rotation handles of the first hologram include a first rotation handle of the first hologram, a second rotation handle of the first hologram, and a third rotation handle of the first hologram; and wherein the first rotation handle of the first hologram is associated with rotating the first hologram in a first manner, the second rotation handle of the second hologram is associated with rotating the first hologram in a second manner that is different from the first manner, and the third rotation handle is associated with rotating the first hologram in a third manner that is different from the first manner and different from the second manner; and
   responsive to manipulation of the first rotation handle of the first hologram by the operator, causing the first hologram to rotate in the first manner based on the manipulation.

2. The apparatus of claim 1, wherein causing the first hologram to be displayed with the at least three rotation handles of the first hologram includes selectively displaying the at least three rotation handles of the first hologram, such that the at least three rotation handles of the first hologram are displayed responsive to a gaze of the operator being near the first hologram, and such that the at least three rotation handles are hidden while the gaze of the operator is distant from the first hologram.

3. The apparatus of claim 1, wherein the first manner is left/right rotation of the first hologram, the second manner is up/down rotation of the first hologram, and the third manner is free rotation of the first hologram.

4. The apparatus of claim 1, the actions further including:
causing the first hologram to be displayed with a first hologram menu that includes selectable commands; and
responsive to rotation of the first hologram caused by manipulation one of the at least three rotation handles, causing the first hologram menu to rotate based on the rotation of the first hologram.

5. The apparatus of claim 1, the actions further including:
determining whether a gaze of the operator is near the first rotation handle of the first hologram; and
responsive to determining that the gaze of the operator is near the first rotation handle of the first hologram, providing a holographic display that indicates the first manner.

6. The apparatus of claim 5, wherein the holographic display that indicates the first manner includes holographic arrows that indicate the first manner.

7. The apparatus of claim 5, the actions further including:
determining whether a gaze of the operator is near the second rotation handle of the first hologram;
responsive to determining that the gaze of the operator is near the second rotation handle of the first hologram, providing a holographic display that indicates the second manner;
determining whether a gaze of the operator is near the third rotation handle of the first hologram; and
responsive to determining that the gaze of the operator is near the third rotation handle of the first hologram, providing a holographic display that indicates the third manner.

8. A method, comprising:
generating a first hologram in a mixed-reality view of an operator such that the first hologram is a three-dimensional hologram;
displaying, in the mixed reality view, at least one rotation handle of the first hologram, wherein the at least one rotation handle of the first hologram includes a first rotation handle of the first hologram; and wherein the first rotation handle of the first hologram is associated with rotating the first hologram in a first manner; and
in response to manipulation of the first rotation handle of the first hologram by the operator, causing the first hologram to rotate in the first manner based on the manipulation.

9. The method of claim 8, wherein displaying the at least one rotation handle of the first hologram includes selectively displaying the at least one rotation handle of the first hologram, such that the at least one rotation handle of the first hologram are displayed responsive to a gaze of the operator being near the first hologram, and such that the at least one rotation handle are hidden while the gaze of the operator is distant from the first hologram.

10. The method of claim 8, further comprising:
displaying the first hologram with a first hologram menu that includes selectable commands; and
responsive to rotation of the first hologram caused by manipulation one of the at least one rotation handle, causing the first hologram menu to rotate based on the rotation of the first hologram.

11. The method of claim 8, further comprising:
determining whether a gaze of the operator is near the first rotation handle of the first hologram; and responsive to determining that the gaze of the operator is near the first rotation handle of the first hologram, providing a holographic display that indicates the first manner.

12. The method of claim 11, wherein the holographic display that indicates the first manner includes holographic arrows that indicate the first manner.

13. The method of claim 8, wherein the at least one rotation handle further includes a second rotation handle of the first hologram, and wherein the second rotation handle of the second hologram is associated with rotating the first hologram in a second manner that is different from the first manner.

14. The method of claim 13, wherein the at least one rotation handle further includes a third rotation handle of the first hologram, and wherein the third rotation handle is associated with rotating the first hologram in a third manner that is different from the first manner and different from the second manner.

15. A processor-readable storage medium, having stored thereon processor-executable code that, upon execution by at least one processor, enables actions, including:
  causing a mixed-reality view to be provided to a user such that the mixed-reality view includes both a real-world environment of the user and holographic aspects including at least a first hologram, and such that the first hologram is a three-dimensional hologram;
  causing, in the mixed-reality view, the first hologram to be displayed with at least one rotation handle of the first hologram, wherein the at least one rotation handle of the first hologram include a first rotation handle of the first hologram; and wherein the first rotation handle of the first hologram is associated with rotating the first hologram in a first manner, the second rotation handle of the second hologram is associated with rotating the first hologram in a second manner that is different from the first manner, and the third rotation handle is associated with rotating the first hologram in a third manner that is different from the first manner and different from the second manner; and
  upon manipulation of the first rotation handle of the first hologram by the user, altering an orientation of the first hologram in the first manner based on the manipulation.

16. The processor-readable storage medium of claim 15, wherein the at least one rotation handle further includes a second rotation handle of the first hologram, and a third rotation handle of the first hologram; and wherein the second rotation handle of the second hologram is associated with rotating the first hologram in a second manner that is different from the first manner, and the third rotation handle is associated with rotating the first hologram in a third manner that is different from the first manner and different from the second manner.

17. The processor-readable storage medium of claim 15, wherein causing the first hologram to be displayed with the at least one rotation handle of the first hologram includes selectively displaying the at least one rotation handle of the first hologram, such that the at least one rotation handle of the first hologram are displayed responsive to a gaze of the user being near the first hologram, and such that the at least one rotation handle are hidden while the gaze of the user is distant from the first hologram.

18. The processor-readable storage medium of claim 15, the actions further including:
  causing the first hologram to be displayed with a first hologram menu that includes selectable commands; and
  responsive to rotation of the first hologram caused by manipulation one of the at least one rotation handle, causing an orientation of the first hologram menu to be altered based on the altered orientation of the first hologram.

19. The processor-readable storage medium of claim 15, the actions further including:
  determining whether a gaze of the user is near the first rotation handle of the first hologram; and
  responsive to determining that the gaze of the user is near the first rotation handle of the first hologram, providing a holographic display that indicates the first manner.

20. The processor-readable storage medium of claim 19, wherein the holographic display that indicates the first manner includes holographic arrows that indicate the first manner.

* * * * *